Aug. 2, 1960 — C. B. STEVENS — 2,947,277
SEDAN-TYPE BOAT

Filed Jan. 16, 1958 — 4 Sheets-Sheet 1

INVENTOR.
CLIFFORD BROOKS STEVENS
BY
Wheeler, Wheeler & Wheeler
ATTORNEYS

Aug. 2, 1960 C. B. STEVENS 2,947,277
SEDAN-TYPE BOAT
Filed Jan. 16, 1958 4 Sheets-Sheet 2
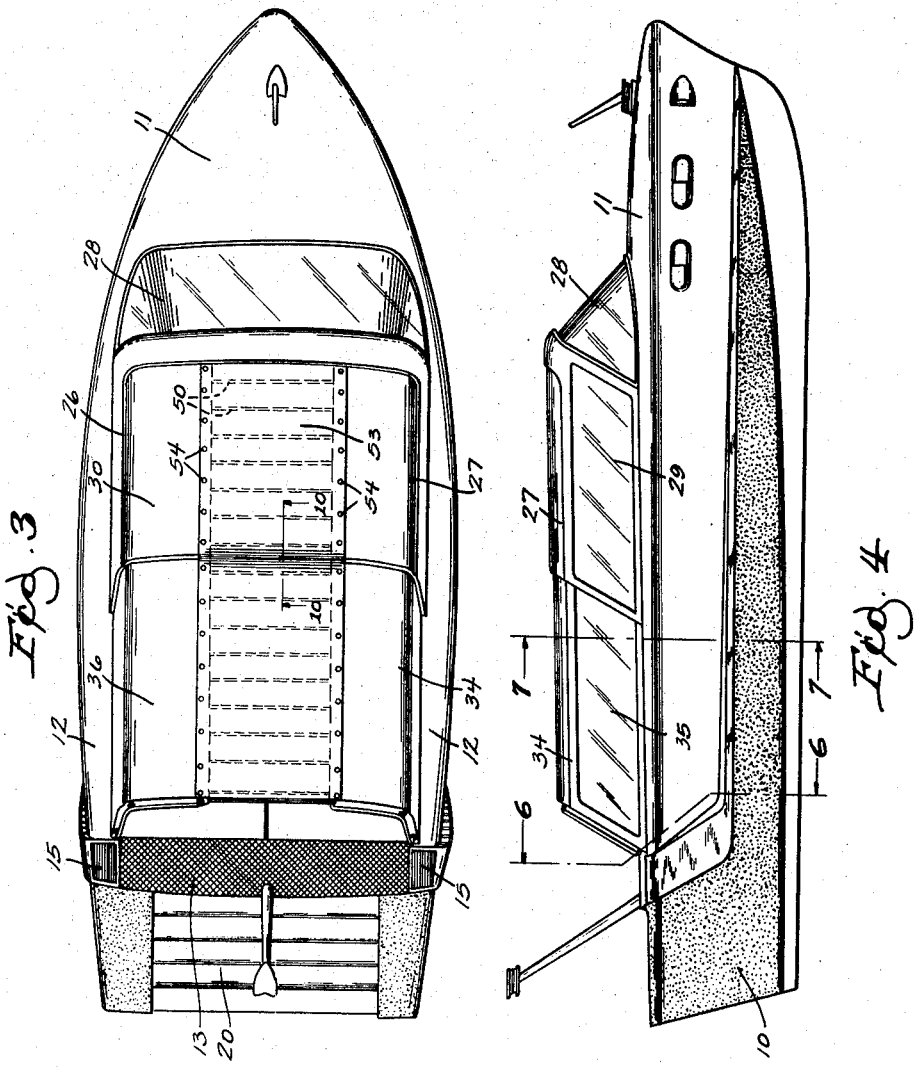
INVENTOR.
CLIFFORD BROOKS STEVENS
BY
Wheeler, Wheeler & Wheeler
ATTORNEYS

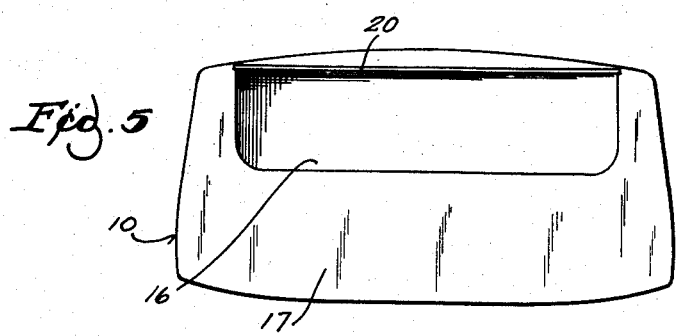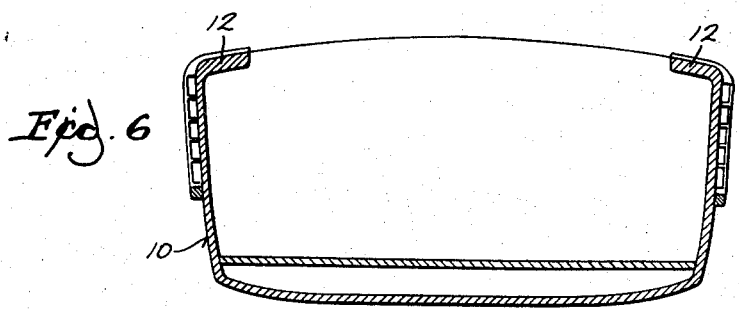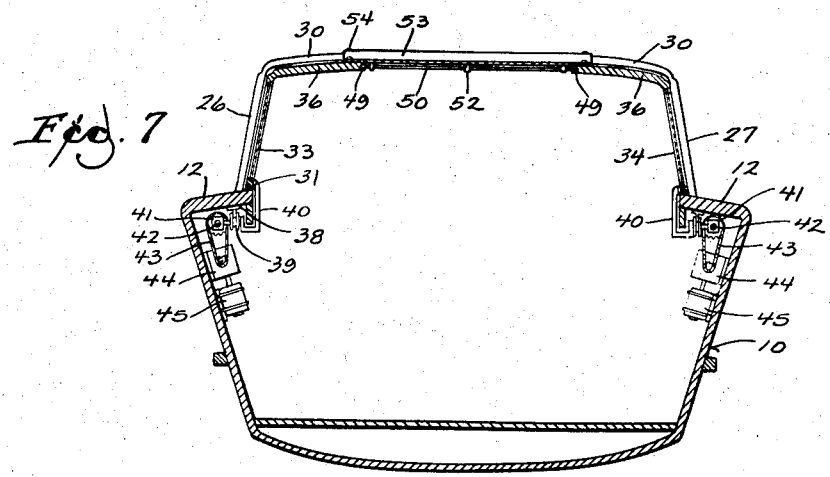

Aug. 2, 1960

C. B. STEVENS 2,947,277

SEDAN-TYPE BOAT

Filed Jan. 16, 1958

INVENTOR.
CLIFFORD BROOKS STEVENS
BY
Wheeler, Wheeler & Wheeler
ATTORNEYS

2,947,277
SEDAN-TYPE BOAT

Clifford Brooks Stevens, Milwaukee, Wis., assignor to Outboard Marine Corporation, Waukegan, Ill., a corporation of Delaware Filed Jan. 16, 1958, Ser. No. 709,377

5 Claims. (Cl. 114—71)

This invention relates to an improvement in a sedan-type boat.

The invention consists primarily in the provision of telescopically collapsible cabin sections and a pleated collapsible roof intervening between starboard and port cabin sections collapsible and extensible in all positions of the aft cabin sections.

The interior seats, in the preferred arrangement shown, include seats so disposed as to face each other in the aft cockpit which is opened when the aft cabin sections are telescoped respecting the forward cabin sections. Forwardly of this set of seats are additional seats accommodating the pilot and a companion or companions, all seats desirably being convertible for sleeping purposes.

Behind removable glass panels which close the cabin when the aft sections thereof are in use is a short deck used for access to the cockpit. Behind this is a well to receive the powerhead of an outboard motor for which support is provided by a transom at the rear of the well. This well, like the main cabin, may be covered by a collapsible, flexible roof comprising slats and foldable web material.

In the drawings:

Fig. 3 is a plan view of the boat with the aft cabin in use as in Fig. 2.

Fig. 4 is a side elevation of the boat shown in Fig. 3.

Fig. 5 is a view of the hull in rear elevation.

Fig. 6 is a view taken in section on the line 6—6 of Fig. 4.

Fig. 7 is a view taken in section on the line 7—7 of Fig. 4.

Figure 1:
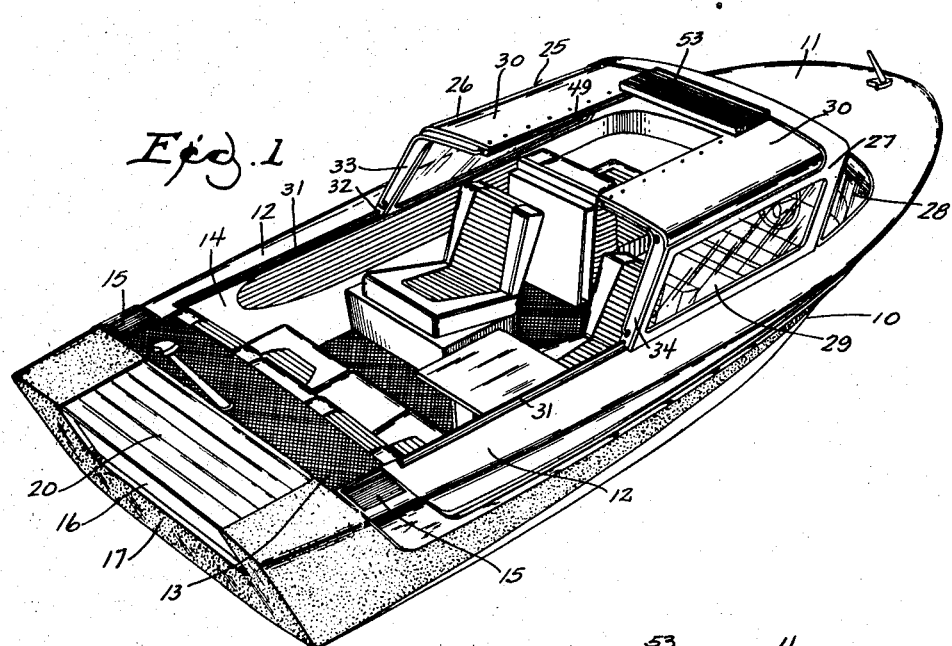
Fig. 1 is a view in perspective showing a boat embodying the invention with the rear cockpit open.
Figure 2:
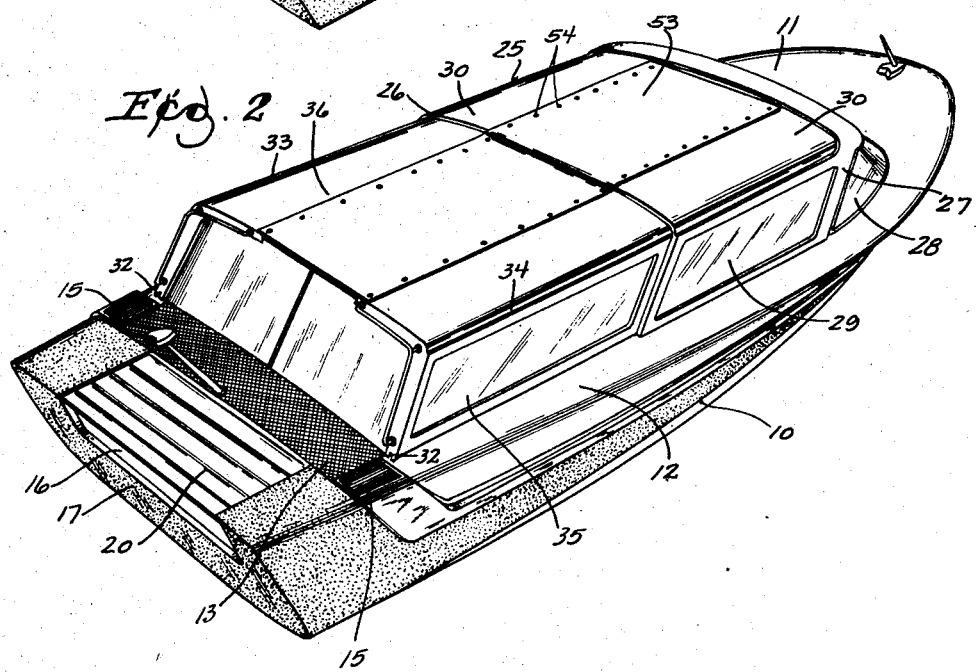
Fig. 2 is a view similar to Fig. 1 showing the boat as it appears when the aft cabin section encloses the rear cockpit.
Figure 8:
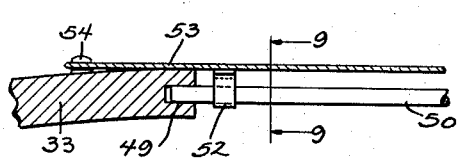
Fig. 8 is an enlarged detail view of a portion of Fig. 7.
Figure 9:
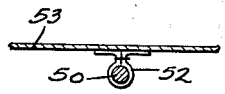
Fig. 9 is an enlarged detail view taken in section on the line 9—9 of Fig. 8.
Figure 10:
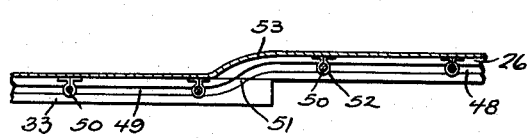
Fig. 10 is an enlarged detail view taken in section on the line 10—10 of Fig. 3.
Figure 11:
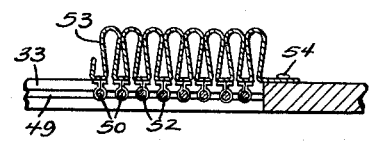
Fig. 11 is a fragmentary detail view in the same plane as Fig. 10, showing a forward portion of the cabin as it appears when the collapsible canopy web is folded.

The hull generically designated by reference character 10 may be of any approved design. As shown, it has a forward deck 11 and narrow side decks 12 communicating with a short rear deck 13 giving access to the cockpit 14 and provided with step pads 15. The hull extends rearwardly of rear deck 13 to provide a transverse shallow well at 16 in which may be received the powerhead of an outboard motor (not shown) such as may be mounted conventionally on transom 17.

A cover 20 retractably covers the well 16, desirably being made of slats and a flexible web which is folded between the slats in the retraction of the cover when the slats are slid forwardly in channels provided in the hull according to the construction of the cabin cover hereinafter described.

The cabin generically designated by reference character 25 may unitarily comprise a pair of relatively fixed side sections 26, 27 unitary with windshield 28. The side sections have windows 29 and each includes a side roof portion 30.

Extending along the side decks 12 are guide rails 31 which provide tracks received into kerfs 32 of aft cabin sections 33, 34. Like the forward cabin sections, these are provided with windows as shown at 35, and with laterally spaced roof sections 36. The aft cabin sections 33 and 34 are slightly closer to each other and slightly lower than the forward cabin sections 26 and 27 whereby the aft cabin sections telescope forwardly beneath the forward cabin sections in the manner clearly shown in Fig. 1.

Figure 12:
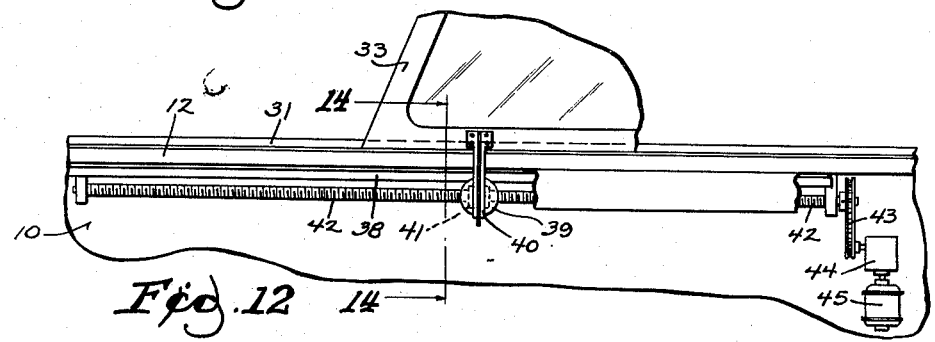
Fig. 12 is an enlarged detail view in side elevation fragmentarily showing the interior of one side of the hull, with portions broken away to show the screw and nut used for extension of the telescopically retractible section of the cabin.
Figure 13:
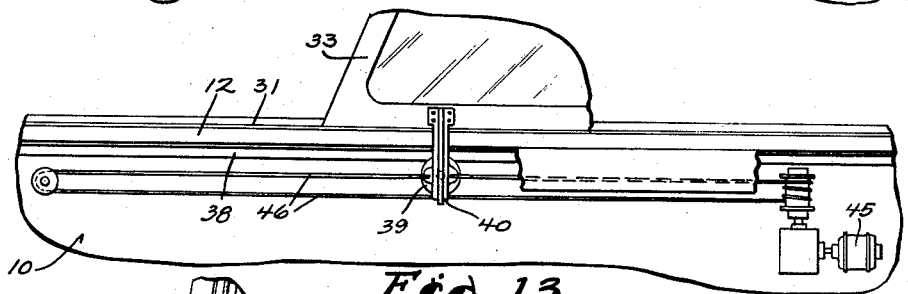
Fig. 13 is a view similar to Fig. 12 showing a modified embodiment of the arrangement for moving the retractible section of the cabin.
Figure 14:
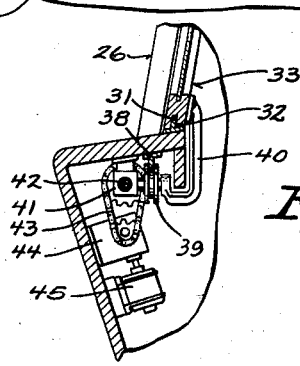
Fig. 14 is an enlarged detail view taken in section on the line 14—14 of Fig. 12.

To maintain the aft cabin sections 33 and 34 upright in the course of their movement to and from telescopic position within the forward cabin sections 26 and 27, a complementary rail 38 is desirably located beneath each of the side decks 12, and a follower 39 riding on each rail 38 is connected by a bracket 40 with the respective cabin section. The cabin sections are desirably power propelled in their forward and aft movement. They may be propelled by cables 46 driven by a motor 45 and connected with the respective brackets 40 as shown in Fig. 13, or, as shown in Figs. 7, 12, and 14 the bracket may be provided with a follower nut 41 operating on a screw 42 beneath the respective deck, the screw being driven by a chain 43 from speed reducer 44 and motor 45.

The respective fore and aft cabin sections have laterally open channels 48, 49 in their mutually spaced margins to accommodate bars 50. When the aft cabin sections are fully extended, their channels communicate at 51 with the channels of the forward cabin sections to enable the bars 50 to be passed from channels 48 to channels 49. Connected with the bars, as by means of straps 52, is the flexible canopy web 53. This web is considerably wider than the space between the roof sections and is desirably fastened snugly, as by means of snap fasteners 54, to the respective cabin sections when it is desired to close the opening therebetween. Otherwise the canopy is folded in pleats at the front of the cabin, with all of the supporting bars 40 assembled beneath it. With the canopy extended and connected by snap fasteners or otherwise to the cabin sections, the cabin is snugly closed and the canopy is supported by the bars against sagging between the cabin sections.

I claim:

1. In a boat, the combination with a hull portion having spaced guides along its sides, of laterally spaced separate cabin roof portions having spaced means engaging respective guides, whereby the roof portions are movable along the side portions of the hull without dependence upon each other, and canopy means for bridging the space between said cabin roof portions transversely of the hull.

2. The device of claim 1 together with fixed cabin means with respect to which said cabin roof portions are telescopically movable upon said guides.

3. The device of claim 2 in further combination with means for mechanically effecting such movement.

4. In a boat, the combination with a hull and cabin sections having laterally spaced roof portions marginally provided with guides, of support bars having their ends movable along the respective guides, and a canopy lapping the roof portions of the spaced cabin sections and connected with said bars, the canopy being extensible along the space between the roof portions of the cabin sections for the closing and opening of said space, and having portions between bars adapted to be folded in a collapsed position as the bars are moved along said guides into positions proximate to each other, and additional cabin sections having mutually spaced roof portions and with respect to which the cabin sections first mentioned are telescopically movable, the last mentioned cabin sections having guides with which the guides of the first mentioned cabin sections communicate in predetermined positions of movement of the first mentioned cabin sections respecting the last mentioned cabin sections, whereby said bars can be moved from the guides of one of said sections into the guides of the other, the said canopy means being extensible across the spaces between roof portions of the sections of both of said pairs.

5. A boat having fore and aft cockpit portions in combination with a relatively fixed cabin section connected to the boat at its fore cockpit portion, aft cabin sections laterally spaced from each other and movable telescopically with respect to the fore cabin section between first positions in which the said laterally spaced sections are opposite the aft cockpit portion and second positions in which they register with the fore cockpit portion of the boat, the boat having means engaging the respective aft cabin sections and supporting them for movement between said positions without dependence upon each other.

References Cited in the file of this patent

UNITED STATES PATENTS

| | | |
|---|---|---|
| 1,295,893 | Hartz | Mar. 4, 1919 |
| 1,705,592 | Smith | Mar. 19, 1929 |
| 2,807,499 | Duddleston | Sept. 24, 1957 |

FOREIGN PATENTS

| | | |
|---|---|---|
| 612,214 | Great Britain | Nov. 10, 1948 |
| 1,019,199 | Germany | Nov. 7, 1957 |